United States Patent [19]

McClure et al.

[11] Patent Number: 5,687,548
[45] Date of Patent: Nov. 18, 1997

[54] DISPENSER CONTROL SYSTEM FOR ROUND BALE WRAPPING APPARATUS

[75] Inventors: John R. McClure, New Holland; Mark K. Chow, Paoli, both of Pa.

[73] Assignee: New Holland North America, Inc., New Holland, Pa.

[21] Appl. No.: 651,026

[22] Filed: May 21, 1996

[51] Int. Cl.⁶ .................. B65B 13/04; B65B 41/00
[52] U.S. Cl. .................. 53/399; 53/430; 53/118; 53/587; 53/64; 53/389.3
[58] Field of Search .................. 53/64, 118, 587, 53/389.2, 507, 508, 399, 430

[56] References Cited

U.S. PATENT DOCUMENTS

| | | | |
|---|---|---|---|
| 5,036,642 | 8/1991 | Underhill | 53/118 |
| 5,243,806 | 9/1993 | Jennings et al. | 53/118 |

*Primary Examiner*—Linda Johnson
*Attorney, Agent, or Firm*—Larry W. Miller; John W. Stader; Frank A. Seemar

[57] ABSTRACT

An agricultural baler for forming and wrapping cylindrical packages of crop material. The baler includes a sledge assembly moveable between a starting position and full bale position. A plurality of rollers on the sledge assembly cooperate with an apron to define a bale forming chamber. Wrapping is accomplished via a system that includes a dispensing mechanism carried on the sledge assembly for dispensing sheet material, such as net or the like, into the bale forming chamber whereupon it is wrapped circumferentially around a formed cylindrical package of crop material as it is rotated in the chamber. The net wrapping system includes means for controlling the position of the dispensing mechanism relative to the sledge assembly by continuously sensing its position.

11 Claims, 5 Drawing Sheets

DISPENSER CONTROL SYSTEM FOR ROUND BALE WRAPPING APPARATUS

FIELD OF THE INVENTION

This invention relates generally to a baler for forming cylindrical packages of crop material, commonly referred to as a round baler. More particularly, this invention pertains to a system for precisely sensing the position of the net dispensing mechanism in the wrapping assembly for a round baler of the type disclosed in U.S. Pat. No. 5,243,806, entitled APPARATUS FOR WRAPPING ROUND BALES WITH SHEET MATERIAL, issued in the name of Richard E. Jennings, et al, on Sep. 14, 1993, and assigned to a common assignee, New Holland North America, Inc.

BACKGROUND OF THE INVENTION

Prior art balers of this type generally have a bale forming chamber defined by an apron comprising an array of side-by-side belts, transverse slats trained on chains, a plurality of rolls or a combination of these various elements, e.g., rolls and belts. Standing crop, such as alfalfa, is usually prepared for baling by being cut and left in the field to cure. Subsequently, the baler traverses the field, picks up the cut crop, feeds it into a fixed or adjustable chamber where it is rolled up to form a compact cylindrical package of hay. The package is wrapped in its compacted state by net, twine or the like, to form a bale that is ejected from the chamber onto the ground for feeding in the field or transport to a remote location.

Exemplary of prior art round balers of the type to which general reference is made is the baler disclosed in above mentioned U.S. Pat. No. 5,243,806, issued on Sep. 14, 1993, in the name of R. E. Jennings, et al. This baler includes a mechanism for dispensing continuous net material into a bale forming chamber to circumferentially wrap a formed cylindrical package of crop material. The dispensing mechanism includes a unique net insertion arrangement mounted on a pivotally mounted sledge assembly, which assembly also carries forming elements that define a portion of the chamber. These elements rotate the cylindrical package during formation as it is being expanded to its desired diameter. The forming elements also serve to rotate the package during wrapping.

A grasping assembly on the dispensing mechanism inserts the net tail into the chamber to initiate wrapping of the cylindrical package formed in the chamber. In net wrapping systems of this type it is crucial that a tail of adequate length is introduced into the chamber to assure that it is grasped to immediately initiate feeding, i.e., when a properly formed tail is placed in the chamber it is pinched between the outer surface of the cylindrical package and the forming elements. A predetermined tail length is determinative of consistent grasping during wrapping, and for this reason it is critical that this predetermined tail length be reliably maintained.

A principle reason giving rise to the need for reliable pinching in that the insertion means withdraws to a precut position for dispensing shortly after the tail is inserted. The tip of the insertion means is withdrawn sufficiently to avoid fouling caused by loose hay and other debris on or in the vicinity of the outer surface of the bale. Thus, in essence there are three conditions for the insertion means, retracted, inserted and partly retracted, i.e., the precut position at which the net is guided to the chamber from the grasping assembly under conditions where the insertion means is withdrawn to an intermediate position.

In the prior art baler shown in U.S. Pat. No. 5,243,806 a linkage system is used to operate the net dispenser and net cutter, both of which respond to an electrical actuator. A main control arm, forming an integral part of the linkage system, is reciprocated by the actuator during operation. In the past magnets have been mounted at fixed locations along the control arm. A fixed sensor senses the two operative positions of the insertion means, i.e., retracted and precut positions. Although these sensors are not shown in the patent, it is admitted that fixed positions of the control arm can be sensed to determine corresponding positions of the insertion means.

Various problems have been encountered under certain circumstances when fixed sensors are used. For example, when readout of differing positions are desired to accommodate different tail lengths, it is necessary to add more magnets or physically move the existing magnets and/or sensing devices, either of which solutions is unduly burdensome. Other problems have been experienced under conditions where it has been necessary to reset the position of the sensors on the control arm relative to associated functions of other assemblies such as the release for the net brake which must be closely coordinated with the fully extended and fully retracted positions. Further, magnetic sensors are subject to environmental problems caused by vibrations, ferrous debris in the gap and varying gap dimension, all of which could have a detrimental effect on the magnetic field being sensed.

SUMMARY OF THE INVENTION

An important object of the present invention is to provide improved wrapping apparatus for a round baler that enhances the reliability by continuously sensing the position of the net insertion means and thereby improves the overall performance.

In pursuance of this and other important objects the present invention provides for a new and unique improvement to round balers having a main frame, a tailgate pivotally connected to the main frame, a sledge assembly mounted on the main frame for movement between a bale starting position and a full bale position, at least two rollers on the sledge assembly extending transversely of the main frame, an apron movably supported along a continuous path on the main frame and on the tailgate, an inner course of the apron path cooperating with the rollers of the sledge assembly to define a bale forming chamber, and dispensing means carried on the sledge assembly for dispensing sheet material into the bale forming chamber so that the wrapping material is wrapped circumferentially around a cylindrical package of crop material in the bale forming chamber. According to its broadest aspects, the present invention contemplates dispensing means that is pivotally mounted on the sledge assembly for movement between an extended position at which the wrapping material is dispensed and a retracted position, and a control arrangement for controlling the position of the dispensing means relative to the sledge assembly. More particularly, the improvement comprises means for continuously sensing the position of the dispensing mechanism under conditions where the dispensing means moves between the retracted position to the extended position.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
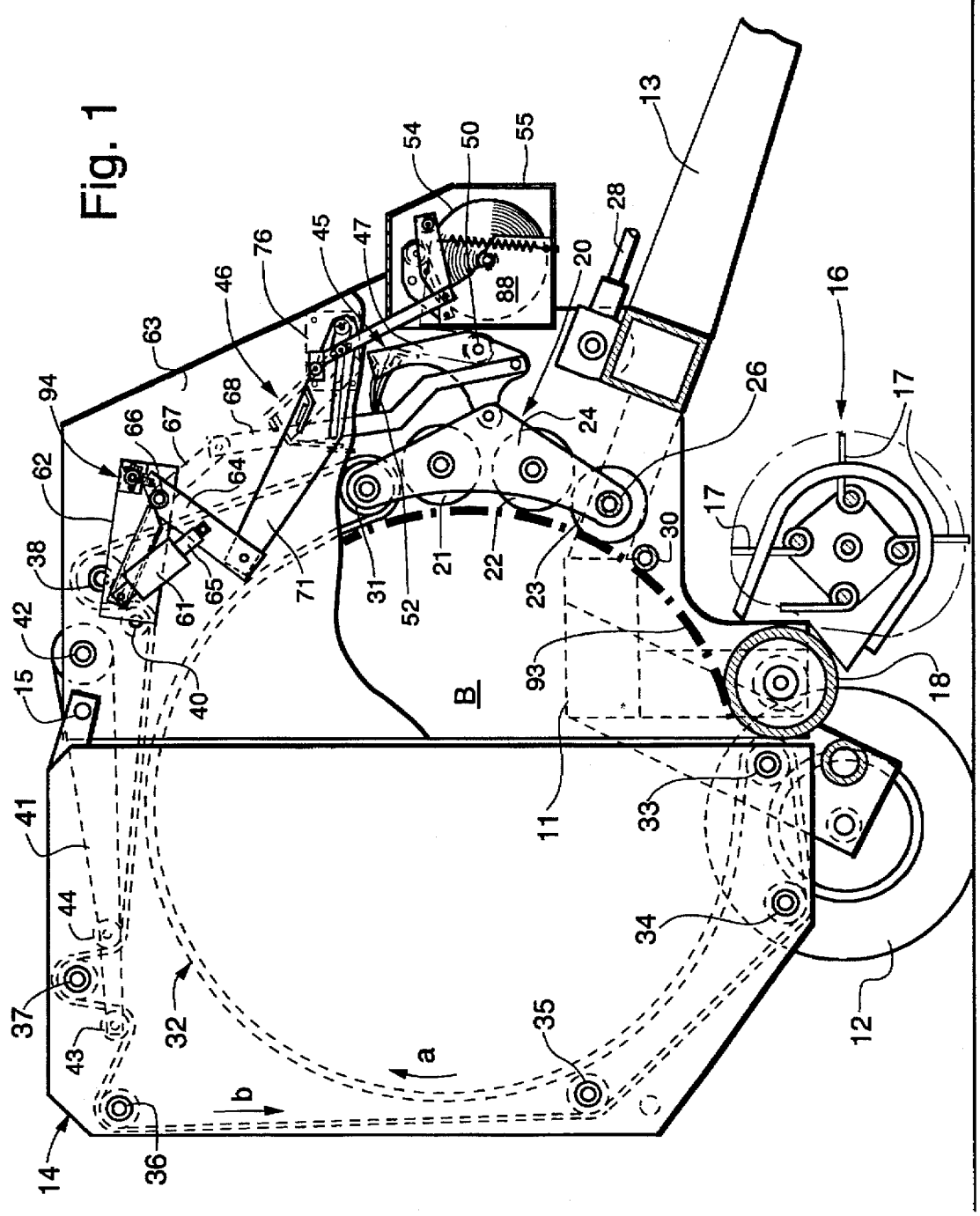
FIG. 1 is a diagrammatic side elevational view of a variable chamber round baler in which the present invention is readily embodied and shows the bale forming chamber in the full bale position.

Referring now to the drawings for a more detailed description of the preferred embodiment of the invention, FIG. 1 shows an expandable chamber round baler 10 of the type disclosed in U.S. Pat. No. 5,243,806. As mentioned above and as will become apparent from the detailed description below, the present invention is directed to an improvement to sheet dispensing apparatus employed in balers of this nature and particularly, balers with net dispensing structure of the general type disclosed in U.S. Pat. No. 5,243,806, hereby incorporated by reference.

Round baler 10 includes a main frame 11 supported by a pair of wheels 12 (only one shown). A tongue 13 is provided on the forward portion of main frame 11 for connection to a tractor. Pivotally connected to the sides of main frame 11 by a pair of stub shafts 15 is tailgate 14 which may be closed (as shown in FIG. 1) during bale formation or pivoted open about stub shafts 15 to discharge a completed bale. A conventional pickup 16, mounted on main frame 11, is supported by a pair of suitable wheels (not shown). Pickup 16 includes a plurality of fingers or tines 17 movable in a predetermined path to lift crop material from the ground and deliver it rearwardly toward a floor roll 18, rotatably mounted on main frame 11.

The bale forming chamber is defined partly by a sledge assembly 20 comprising a plurality of rollers 21, 22, 23 extending transversely of the main frame 11 in the arcuate array seen in FIG. 1. Rollers 21, 22, 23 are journalled at their respective ends in a pair of spaced apart roll carrying arms 24. These arms 24 are pivotally mounted inside main frame 11 on stub shafts 26 for providing movement of sledge assembly 20 between a bale starting position (not shown) and the full bale position shown in FIG. 1. Rollers 21, 22, 23 are driven in a counterclockwise direction as viewed in FIG. 1 by conventional means (for example, chains and sprockets or gears) connected with a drive shaft 28 which is in turn connected to the power-take-off of a tractor. A starter roll 30 is located adjacent roller 23 and is also driven counterclockwise. A freely rotatable idler roller 31, also carried by arms 24, moves in an arcuate path with sledge assembly 20 as it moves between its bale starting position and full bale position (FIG. 1).

The bale forming chamber is further defined by an apron 32 comprising a plurality of continuous side-by-side belts supported by guide rolls 33, 34, 35, 36, 37 which are rotatably mounted in tailgate 14. Apron 32 is also supported on a drive roll 38, rotatably mounted on main frame 11. Although apron 32 passes between roller 21 on sledge assembly 20 and idler roller 31, it is only in engagement with idler roller 31 and not roller 21 which is located in close proximity to the apron belts for the purpose of striping crop material from the belts. Suitable means (not shown) are connected with drive shaft 28 to provide rotation of drive roll 38 in a direction causing movement of apron 32 along its path in a direction indicated by arrows a and b in FIG. 1. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner and outer positions, the outermost position being shown in FIG. 1. Take up arms 41 carry additional guide rolls 43, 44 for supporting apron 32. Resilient means, such as coil springs, are provided to urge take up arms 41 toward their inner positions while resisting movement to their outer positions (FIG. 1).

Figure 2:
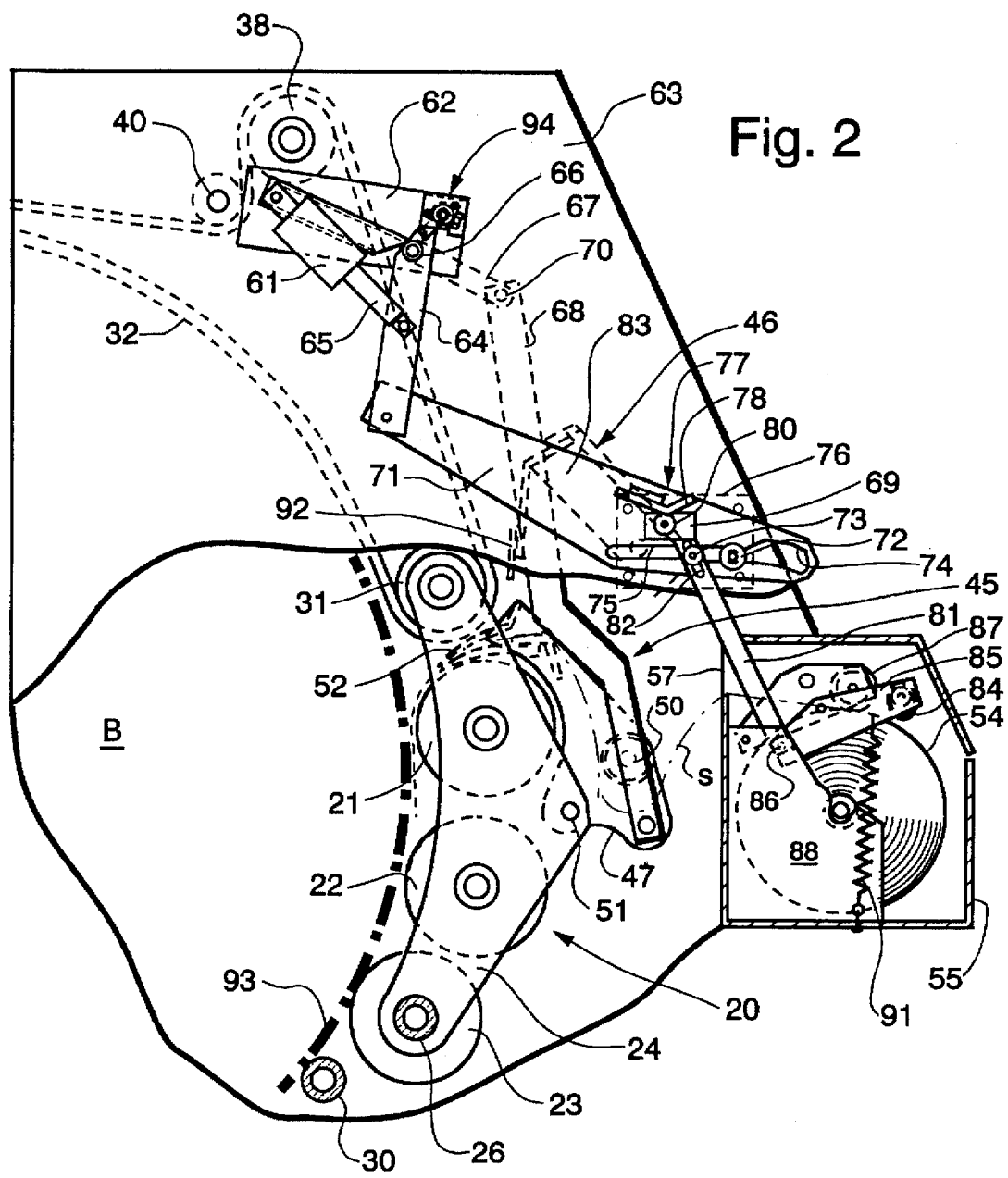
FIG. 2 is a detailed side elevational view of the control mechanism for the net wrapping apparatus of the baler shown in FIG. 1 and shows the net insertion means in its fully extended position.
Figure 3:
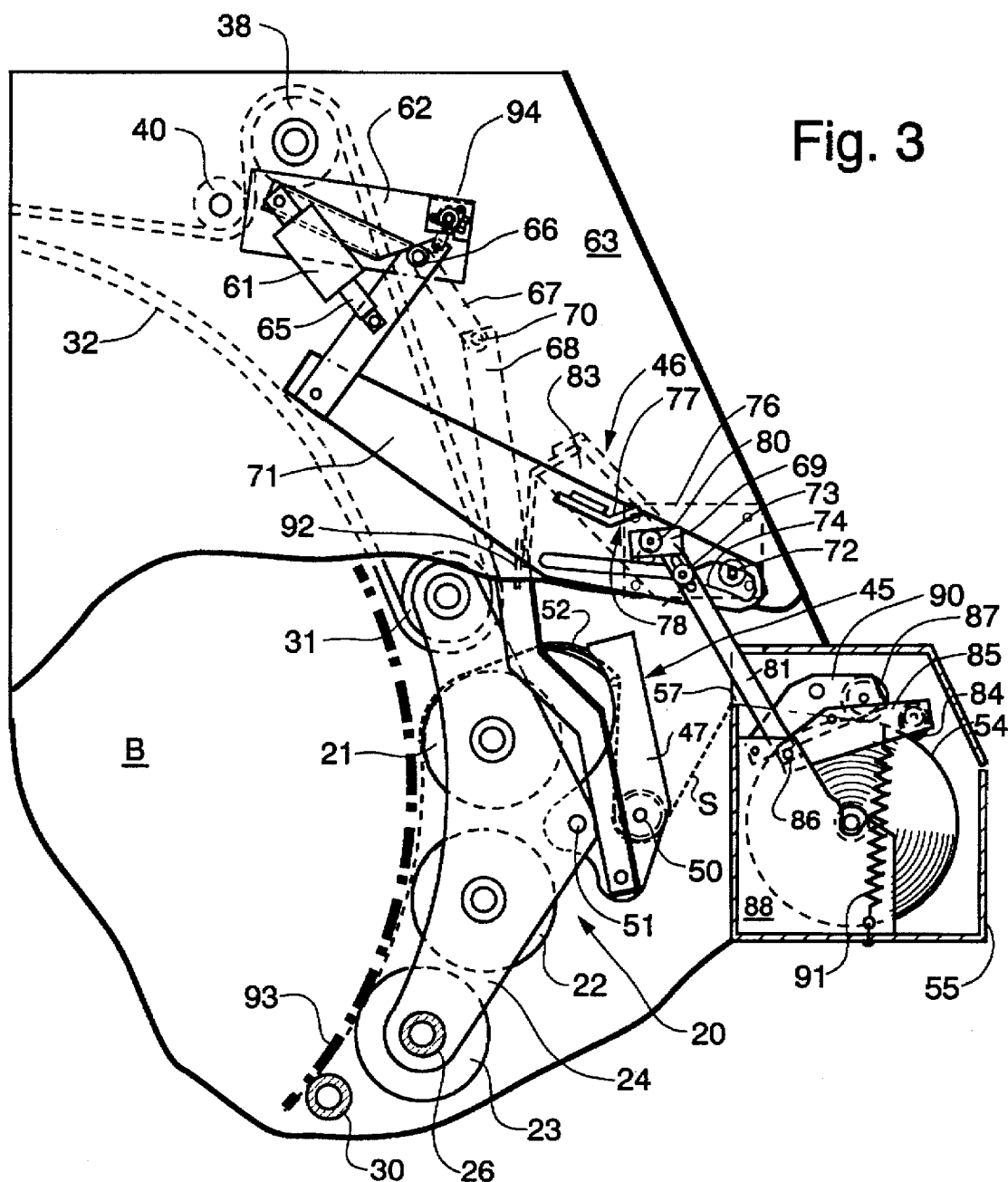
FIG. 3 also is a detailed side elevational view of the control mechanism for the net wrapping apparatus of the baler shown in FIG. 1 and shows the net insertion means after it has been withdrawn from its fully extended position to its pre-cut position.
Figure 4:
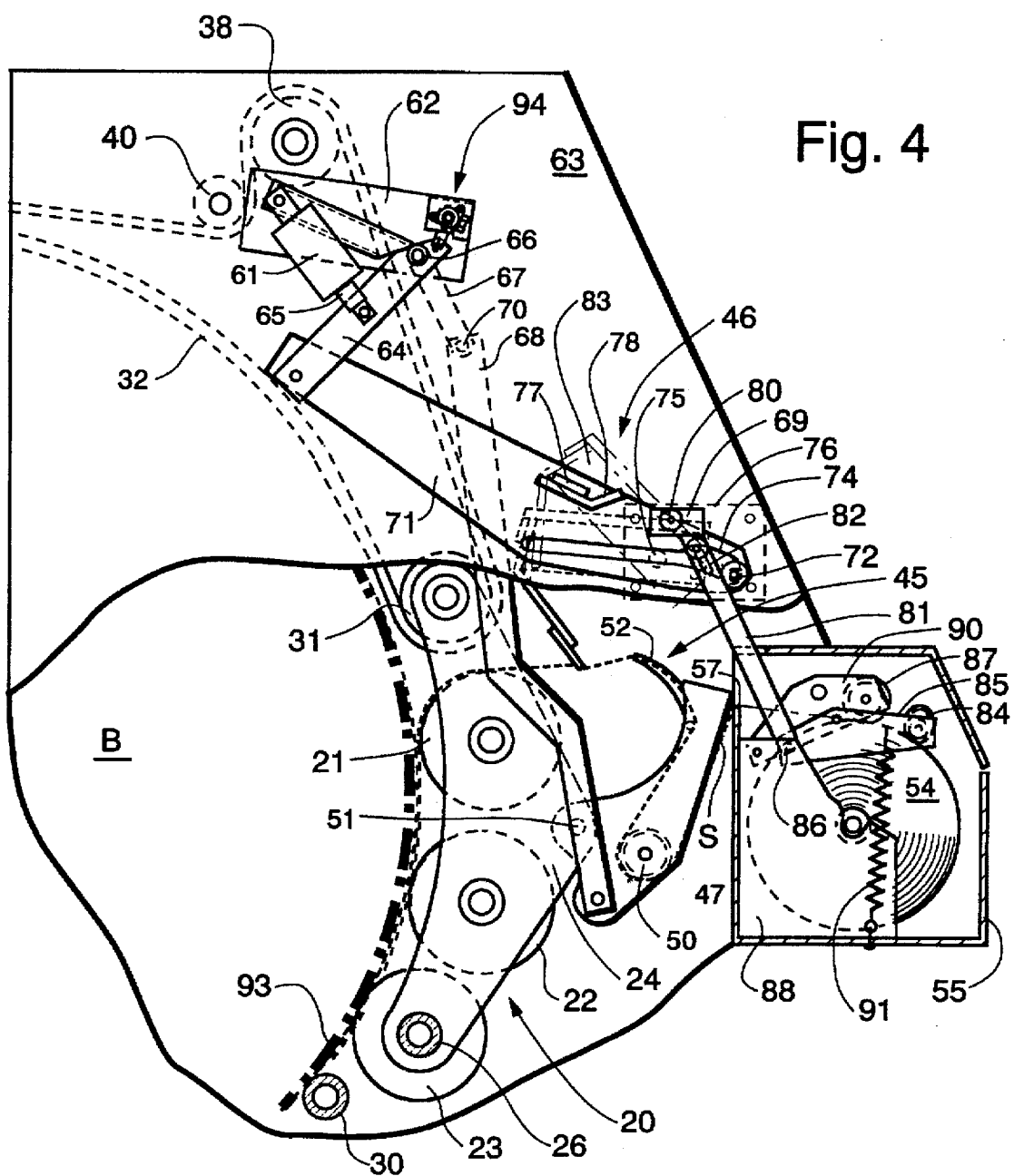
FIG. 4 is a third detailed side elevational view of the control mechanism for the net wrapping apparatus of the baler shown in FIG. 1 and show the net insertion means in the fully retracted position.

Now turning to the bale wrapping system, FIG. 1 shows a net dispensing mechanism 45 pivotally mounted on sledge assembly 20 and an interrelated cutting assembly 46 (phantom outline) pivotally mounted between the side walls on main frame 11. As best seen in FIGS. 2–4 dispensing mechanism 45 comprises a pair of levers 47 spaced apart, inter alia, by a transverse idler roll 50. Levers 47 are rotatably supported on a cross tube 51 that extends between arms 24 of sledge assembly 20. The dispensing mechanism 45 further comprises a transverse net grasping or clamping assembly 52 also extending between levers 47 and arranged to dispense into the forming chamber sheet material s, such as net or the like, from a supply roll 54 disposed in a container 55. Clamping assembly 52 may be mounted between levers 47 by bars such as those shown in U.S. Pat. No. 5,036,642, issued Aug. 6, 1991 in the name of Kenneth R. Underhill, et al, which clamping structure and mounting arrangement are hereby incorporated by reference. Thus, as sheet material s is pulled from supply roll 54 via a slot 57 and guided to clamping assembly 52 of dispensing mechanism 45, it passes under idler roller 50 which is mounted between and extends transversely of levers 47. Idler roller 50 may be provided with net spreading elements whereby the net passing over idler roll 50 is urged outwardly at the ends.

Referring now to FIGS. 2–4, the bale wrapping system also includes an electro-mechanical control system for sequentially actuating a net brake in conjunction with the net dispensing mechanism as it is moved between a net feeding operative position, as shown in FIG. 2, and a nonoperative retracted position, as shown in FIGS. 1 and 4. The control system also provides for proper actuation of the net cutting assembly to avoid a premature release, the interrelated operation of which elements is disclosed in detail in U.S. Pat. No. 5,248,806. In FIGS. 1 and 4 an electric actuator 61 is shown in its retracted position whereas in FIG. 2 it is shown in its fully extended position while the partly extended position is shown in FIG. 3.

Actuator 61 is pivotally mounted to plate 62, which is affixed to the outer surface of sidewall 63 of mainframe 11. A link member 64, pivotally attached to actuator element 65, is pivoted about fixed pivot pin 66 between the retracted position shown in FIGS. 1 and 4 and the fully extended position shown in FIG. 2. Affixed to link member 64 and adapted for rotation about pin 66 and inwardly of side wall 63 is lever 67 shown downwardly inclined in FIGS. 1 and 4 in the non-actuated position of actuator element 65. A net dispensing actuator arm 68 is pivotally connected to lever 67 via pin 70 inwardly of wall 63, whereby actuator arm 68 moves to the upward position shown in FIG. 2 under conditions where actuator element 65 is extended. When actuator element 65 is retracted, arm 68 is moved downwardly and net dispensing mechanism 45 is moved first to the partly retracted precut position (FIG. 3) and then to the retracted cut and non-operative position (FIG. 4).

Pivotally attached to the lower end of link member 64 is a transverse control arm 71 which reciprocates in a generally for and aft direction in response to the position of actuator element 65. The right end of control arm 71 is primarily supported by fixed flanged roller 72 and secondarily supported by a knife control roller 73, both of which extend through control arm slot 74. FIGS. 3 and 4 show control arm 71 in detail with FIG. 4 depicting conditions when actuator element 65 is fully retracted, and FIG. 3 showing control arm and related elements in an intermediate condition. Net cutting assembly 46 pivots around a fixed pivot 75 via a stub shaft affixed to plate 76 secured to the inside surface of side wall 63.

Secured in the intermediate area of control arm 71 is a ramp element 77 having a ramp section 78 positioned to engage a roller 80 secured to a leg member 69 which is integral with net brake control arm 81. A slot 82 in brake control arm 81 cooperates with knife roller 73 which is secured to knife side plate 83, which roller guides brake arm 81 along a reciprocal path via slot 82. As shown in FIG. 3 brake arm 81 is in its lowermost position when actuator element 65 is in its extended position, and thereby lifts net brake element 84 from the surface of the net supply roll by pivoting brake mounting arm 85 counterclockwise around pin 86. A counter roll 87 is pivotally mounted on a fixed bracket 88 via a counter roll mounting arm 90 and continually held in contact with the surface of net supply roll 54 by means of spring 91 which urges brake mounting arm downwardly and in turn urges counter roll mounting arm 90 downwardly. The number of rotations of roll 87 accurately determines the amount of net dispensed from roll 54. Thus, by counting the number of rotations of the counter roll the desired length of net dispensed can be determined by the known circumference of the bales being formed along with the desired number of wraps or fractional wraps.

Net cutting assembly 46 includes a pair of knife side plates 83 (only one shown) rotatably supported on stub shaft 75. A knife 92 is carried by and extends transversely between knife side plates 83 for engagement with the net material dispensed by dispensing mechanism 45. A similar net cutting assembly that operates in the same general manner is shown in U.S. Pat. No. 5,243,806. For the purposes of this invention the diagrammatic outline showing a cutting assembly in various positions will suffice.

Before describing the specific details of the control system of the present invention, the interrelationship of various baler elements such as the net dispensing mechanism, the actuator, linkages, the cutting mechanism, and the like, of baler 10, will be described. Turning to the point at which a cylindrical package of compacted crop material, designated by reference letter B, has been formed and is ready to be wrapped with net material, electric actuator 61 is activated while apron 32 continues to rotate B in a clockwise direction as viewed in FIGS. 1–4. The outer surface of B is generally defined by heavy broken lines 93. Actuator element 65 of electric actuator 61 drives control arm 71 from left to right and net dispensing actuator arm 81 from the position of FIG. 1 to the position of FIG. 2. This rotates the dispensing mechanism 45 from the position shown in FIG. 1 to position shown in FIG. 2. As the dispensing mechanism 45 moves toward its fully extended position (FIG. 2), the cutting assembly 46 is maintained in the nonoperative position shown in FIG. 2 and clamping assembly 52 moves into a gap between roller 21 and apron 32 to initiate net dispensing. Meanwhile, net brake element 84 has been removed from the surface of supply roll 54 while counter roll 87 is maintained in operative contact therewith permitting the tail of the net material gripped between clamping assembly 52 to be inserted through the gap into the bale forming chamber whereupon it is dragged downwardly and caught in the nip between roller 21 and B which are rotating in opposite directions. Clamping assembly 52 is then retracted to the precut position (FIG. 3) and net material is dispensed along a path from the supply roll 54 via slot 57, around idler roller 50, through clamping assembly 52 and then through the gap into the bale forming chamber where it is wrapped circumferentially around B while it continues to be rotated. Counter roll 87 maintains light continuous contact with the surface of supply roll 54.

After B has been wrapped to form a bale with one or more layers of the net material, electric actuator 61 is fully retracted thereby moving dispensing mechanism 45 from the position shown in FIG. 3 to the position shown in FIG. 4. When dispensing mechanism 45 has been so retracted, net cutting assembly 46 is rotated counterclockwise (FIG. 4) so that knife 92 is brought downwardly at the appropriate time into contact with the expanse of net material extending from clamping assembly 52 of dispensing mechanism 45 to the periphery of roll 21. More specifically, knife side plates 83 rotate about a stub shaft under conditions where knife control roller 73 is released to slide upwardly in brake arm slot 82. Knife 92 cuts the net material in a known manner and leaves a succeeding tail which is gripped by clamping assembly 52 for future insertion into the bale forming chamber when the next package of crop material is ready to be wrapped with net material. Prior to cutting, the net brake has been actuated by control arm 81 which travels upwardly via slot 82, actuation permits braking force to be applied on the net resulting in necessary tension during cutting.

Figure 5:
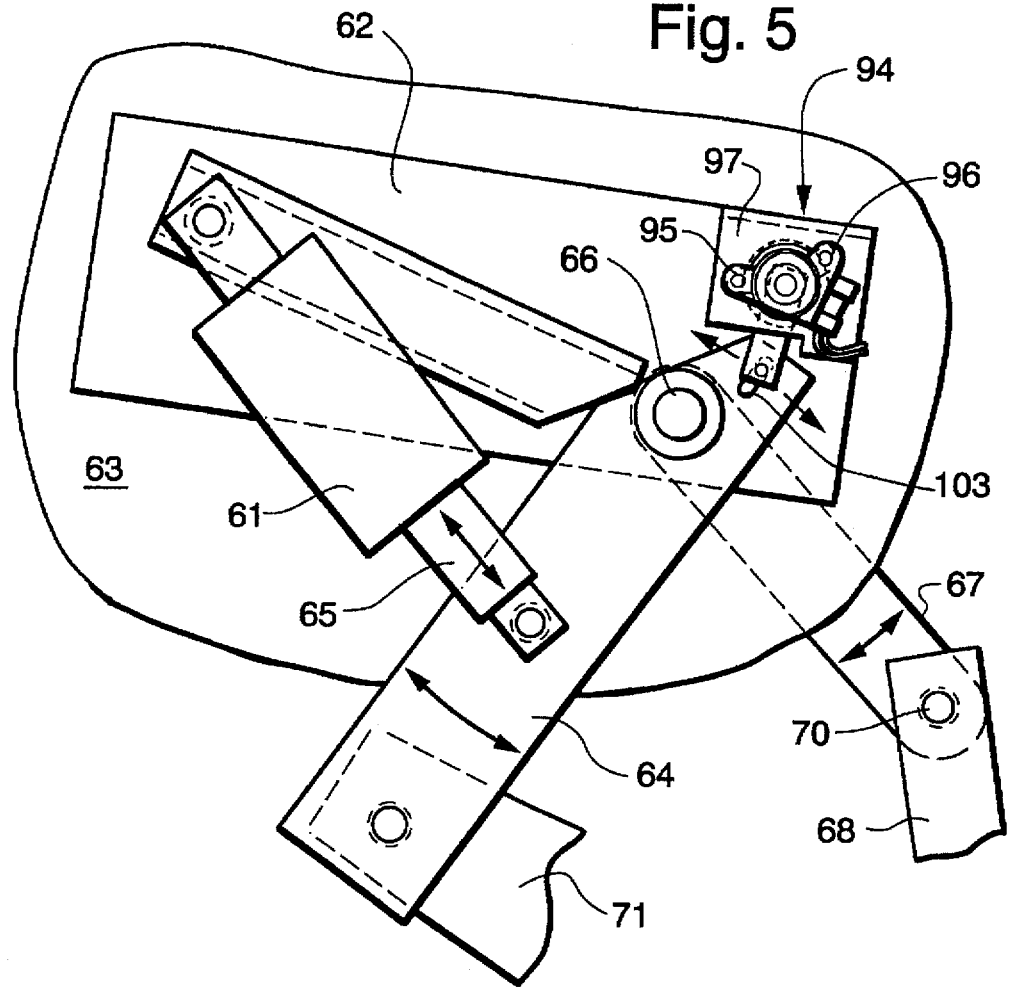
FIG. 5 is a side elevational view showing in further detail elements of the embodiment of the present invention depicted in FIGS. 1 through 4.
Figure 6:
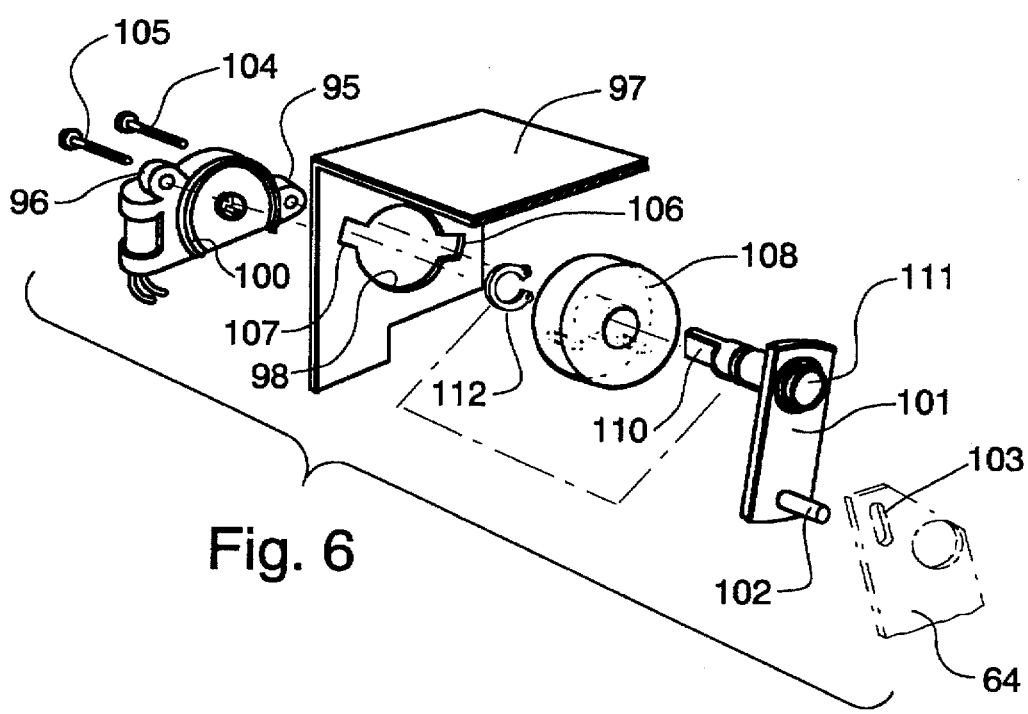
FIG. 6 is an exploded diagrammatical view showing the relationship of elements of the embodiment of the present invention shown in FIG. 5.

Now turning to FIGS. 5 and 6 where the dispenser control system of the present invention is shown, a potentiometer 94 is mounted on bracket 97, which is welded to plate 62. Potentiometer 94 continuously senses the position of control arm 71 by sensing the position of link 64. It is a commercially available product manufactured by CTS Corporation, Elkhart, Ind., under its designated Part Number 06543. Because it is a sealed unit, it enhances system integrity in the dust and debris laden environment under which round balers operate. Ears 95, 96 (see FIG. 6) extend from the body of potentiometer 94 to provide for securement to the surface of mounting bracket 97. A circular opening 98 in bracket 97 snugly accommodates lip 100 extending circumferentially around a centrally located access opening for the potentiometer rotor, which is spring loaded to its home position. The rotor is rotatable against its spring in a conventional manner. The drive angle is approximately 104 degrees in a counterclockwise direction. Thus, force is provided to urge the potentiometer rotor in a clockwise direction (FIG. 5) and thereby acts to urge arm 101 in a counter-clockwise direction as viewed in FIG. 6. This forces rod 102 against the edge of slot 103 and provides zero tolerance positioning, regardless of variations in the slot width caused by manufacturing tolerances and wear. Thus, the position of the potentiometer rotor is precisely maintained relative to link 64 and accordingly, control arm 71.

As depicted in FIG. 6, potentiometer 94 is adjustably mounted to bracket 97 by screws 104, 105 which pass through notches 106, 107 and are secured to steel nut 108. The flat end 110 of pin 111 extends through the center of nut 108 and is secured in place by clip 112 relative to nut 108. The outer diameter of pin 111 is less than the inner diameter of the bore in nut 108 to provide for relative movement when link 64 is rotated. The potentiometer rotor access opening accommodates flat end 110 via mating shoulders in the recess of the rotor, accessible through the opening, such that rotation of link 64 is transferred to rotation of the potentiometer rotor via rod 102, arm 101, and the flat end 110 of pin 111.

The signals provided by the potentiometer 94 are fed to a signal processor and converted to output signals that are used to accurately and continuously determine the position of control arm 71. The potentiometer thus enables the utilization of micro processing technology to provide precise indications of the net dispensing assembly relative to the net severing means. Further, such precision significantly enhances the ability to calibrate the various operative positions, such as INSERT, PRECUT, CUT and HOME, during assembly and service. Additionally, since the potentiometer senses the true position of the net grasping assembly 52, the output signal of the potentiometer sensor varies in accordance with changes in the true position of assembly 52, which can be utilized to provide an audio/visual alarm to alert the operator when the grasping assembly is out of position.

In operation, net dispensing mechanism 45 is in HOME position in FIG. 1 and a completely formed cylindrical package B is shown in the bale chamber. Brake 84 is on, i.e., the downward force on net brake control arm 81 has been released and brake 84 is urged downward against net supply roll 54. Counter roll 87 is bearing against net supply roll 54 with a uniform predetermined force as is the case throughout all of the following sequential steps. Knife cutting assembly 46 is retracted with knife 92 in a position that is clear of the net path and net dispensing mechanism 45. The net tail is held between transverse clamping assembly 52 at a predetermined length that is sufficient for wrap starting.

At this point in the operation, the machine proceeds into the wrapping mode. FIG. 2 shows net dispensing mechanism 45 in INSERT position. The brake 84 has been released and the net tail has been inserted via clamping assembly 52 between apron 32 and roll 21. The tail is being urged in a downward direction by virtue of it being gripped between the surfaces of B and roll 21 which are rotating in opposite directions. The net starts wrapping as soon as it is inserted even though the friction may vary due to the non-uniform consistency of the outer surface of the cylindrical package of crop material B. Net will be gripped between B and roll 21 to hold it against the bale with a sufficient tangential force component to provide suitable pulling force to dispense the net from the supply roll during wrapping.

In FIG. 3 net dispensing mechanism 45 is shown pivoted to the PRECUT position to which it is driven an interval of time after the net is being dispensed and at which position it remains during the remainder of the wrapping phase. During wrapping the brake 84 engages the net supply roll 54 to maintain sufficient force in the net to provide a compact neatly wrapped bale. This engagement takes place after the net tail is firmly gripped between bale B and roll 21.

In the CUT position shown in FIG. 4, dispensing mechanism 45 is rotated away (as shown) from the knife to provide a taut stretch of net between roll 21 and grasping assembly 52. The brake remains engaged and the bale B continues to rotate in the forming chamber as net cutting assembly is thrust downwardly to engage knife 92 with the net. After the net is severed, knife 92 stays down until the bale ejection phase is initiated.

Subsequent to the CUT phase net dispensing mechanism 45 is maintained in the HOME position and the net cutting assembly is lifted away from the severing position. Clamping assembly 52 grasps the net sufficiently to maintain the net tail at its predetermined desired length. This grasping force is sufficient to maintain the net tail length when sledge assembly 20 drops to its starting position whereupon the net is pulled from the supply roll 54 by virtue of net dispensing assembly 45 being pivoted away from its upright CUT position.

Of the many explicit and implicit advantages gained by the present invention, among the most important is the facility for precisely locating the net clamping assembly for providing readily programmable signals used in an electronic control system to enhance the reliability of bale wrapping apparatus.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A round baler for picking up crop material and forming it into cylindrical bales, said baler having a main frame, a tailgate pivotally connected to said main frame, a sledge assembly mounted on said main frame for movement between a bale starting position and a full bale position, said sledge assembly including at least two rollers extending transversely of said main frame, an apron movably supported along a continuous path on said main frame and on said tailgate, said apron path having an inner course that cooperates with the rollers of said sledge assembly to define a bale forming chamber for receiving crop material, a supply of wrapping material, dispensing means carried on said sledge assembly for dispensing said wrapping material into said bale forming chamber to circumferentially wrap a cylindrical package of crop material formed in said bale forming chamber, said dispensing means pivotally mounted on said sledge assembly for movement between an extended position at which said wrapping material is dispensed and a retracted position, and control means for controlling the position of said dispensing means relative to said sledge assembly, the improvement comprising sensing means, associated with said control means, for providing an electrical signal indicative of the position of said dispensing means, said sensing means continuously sensing said position of said dispensing mechanism during movement between said extended position and said retracted position.

2. A round baler as set forth in claim 1 wherein said control means include a linkage assembly having a pivotally mounted element, and means for moving said element over a continuous range of positions that correspond to a similar continuous range of positions of said dispensing mechanism between said extended and retracted positions.

3. A round baler as set forth in claim 2 wherein said means for sensing include a potentiometer for providing said electrical signal indicative of the position of said element in its continuous range of positions that correspond to said similar range of positions of said dispensing mechanism.

4. A round baler as set forth in claim 2, wherein said means for moving comprise an electrical actuator having a first end and a second end exceedable relative to said first end, said first end affixed to said main frame and said second extendable end pivotally attached to said element.

5. A round baler as set forth in claim 1, further comprising a cutting assembly having a cutting element having an inactive position adjacent the path of said wrapping material and an active position in which it is urged into cutting engagement with said wrapping material, and latching means associated with said control means to release said cutting element from said inactive position to said active position under conditions where said cylindrical package of crop material has attained a predetermined size.

6. A round baler for picking up crop material and forming it into cylindrical bales, said baler having a main frame, a sledge assembly mounted on said main frame for movement between a bale starting position and a full bale position, said sledge assembly including at least two rollers extending transversely of said main frame, crop engaging means having a plurality of elements with crop engaging surfaces supported along a continuous path on said main frame, said path including at least in part a span that cooperates with the rollers of said sledge assembly to define a bale forming chamber for receiving crop material, a supply of wrapping material, dispensing means carried on said sledge assembly for dispensing said wrapping material into said bale forming chamber to circumferentially wrap a cylindrical package of crop material formed in said bale forming chamber, said dispensing means pivotally mounted on said sledge assembly for movement between an extended position at which said wrapping material is dispensed and a retracted position, and control means foe controlling the position of said dispensing mechanism relative to said sledge assembly, the improvement comprising sensing means, associated with said control means, for providing an electrical signal indicative of the position of said dispensing means, said sensing means continuously sensing said position of said dispensing mechanism during movement between said extended position and said retracted position.

7. A round baler as set forth in claim 6 wherein said control means include a linkage assembly having a pivotally mounted element, and means for moving said element over a continuous range of positions that correspond to a similar continuous range of positions of said dispensing mechanism between said extended and retracted positions.

8. A round baler as set forth in claim 7 wherein said means for sensing include a potentiometer for providing said electrical signal indicative of the position of said element in its continuous range of positions that correspond to said similar range of positions of said dispensing mechanism.

9. A round baler as set forth in claim 7, wherein said means for moving comprise an electrical actuator having a first end and a second end extendable relative to said first end, said first end affixed to said main frame and said second extendable end pivotally attached to said element.

10. A round baler as set forth in claim 6, further comprising a cutting assembly having a cutting element having an inactive position adjacent the path of said wrapping material and an active position in which it is urged into cutting engagement with said wrapping material, and latching means associated with said control means to release said cutting element from said inactive position to said active position under conditions where said cylindrical package of crop material has attained a predetermined size.

11. In a round baler, the method of wrapping comprising providing a main frame, a sledge assembly mounted on said main frame for movement between a bale starting position and a full bale position, said sledge assembly including at least two rollers extending transversely of said main frame, crop engaging means having a plurality of elements with crop engaging surfaces supported along a continuous path on said main frame, said path including at least in part a span that cooperates with the rollers of said sledge assembly to define a bale forming chamber for receiving crop material, dispensing means carried on said sledge assembly, control means for controlling the position of said dispensing mechanism relative to said sledge assembly, and sensing means associated with said control means for providing an electrical signal indicative of the position of said dispensing means, supplying wrapping material, dispensing said wrapping material into said bale forming chamber to circumferentially wrap a cylindrical package of crop material formed in said bale forming chamber, moving said dispensing means between an extended position at which said wrapping material is dispensed and a retracted position, controlling the position of said dispensing mechanism relative to said sledge assembly, sensing initially the retracted position of said dispensing means, sensing the fully extended position of said dispensing means for insertion of said wrapping material into said bale forming chamber, dispensing wrapping material into said bale forming chamber to circumferentially wrap a cylindrical package of crop material to form a bale under condition where said dispensing means has been retracted to a precut position, sensing said precut position of said dispensing means during dispensing, retracting said dispensing means from its precut position, cutting said wrapping material, and maintaining said dispensing means in its initial retracted position.

* * * * *